April 3, 1928.
G. C. JETT
GATHERER
Filed Dec. 10, 1923
1,665,034
2 Sheets-Sheet 1
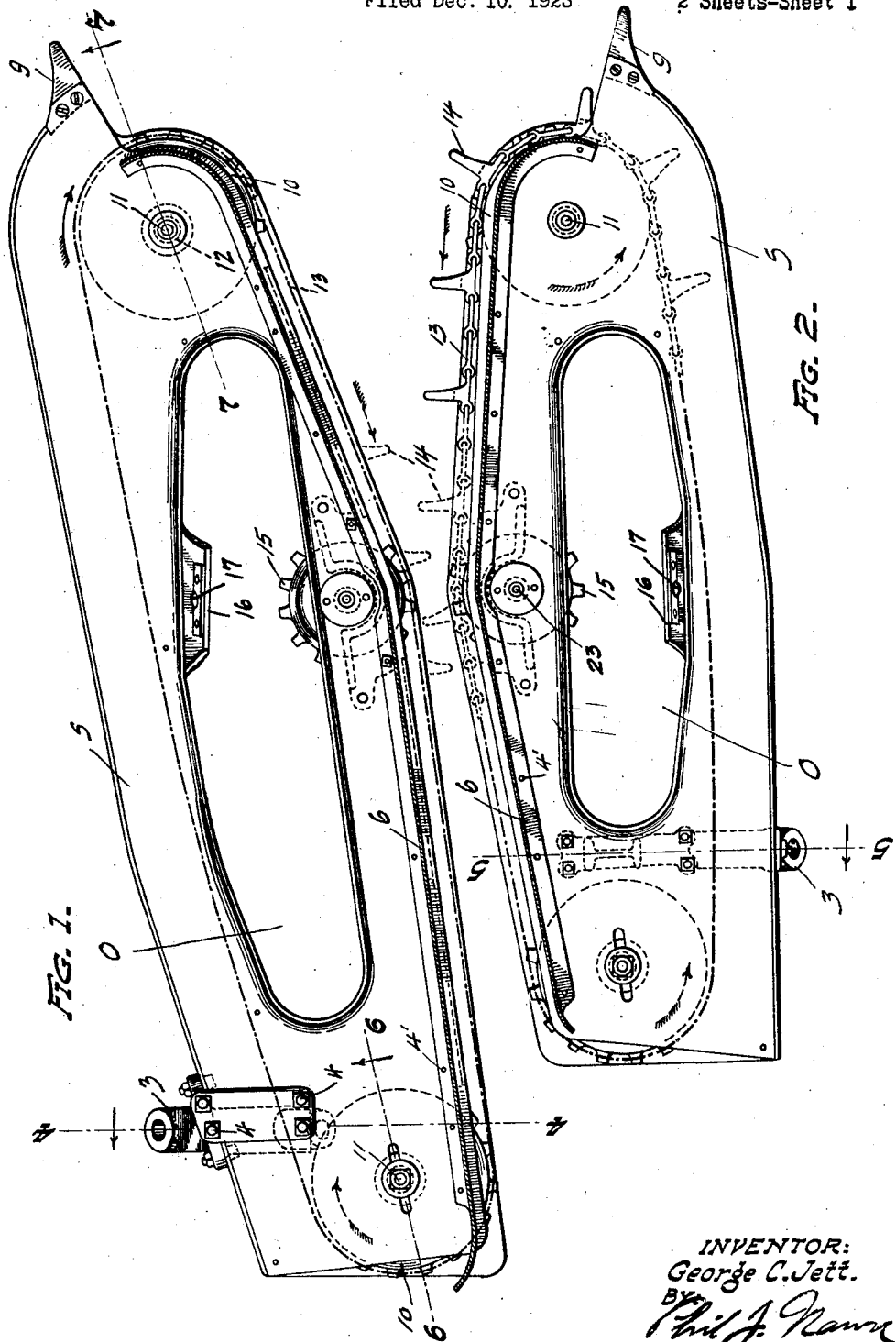
INVENTOR:
George C. Jett.
BY
ATTORNEY.

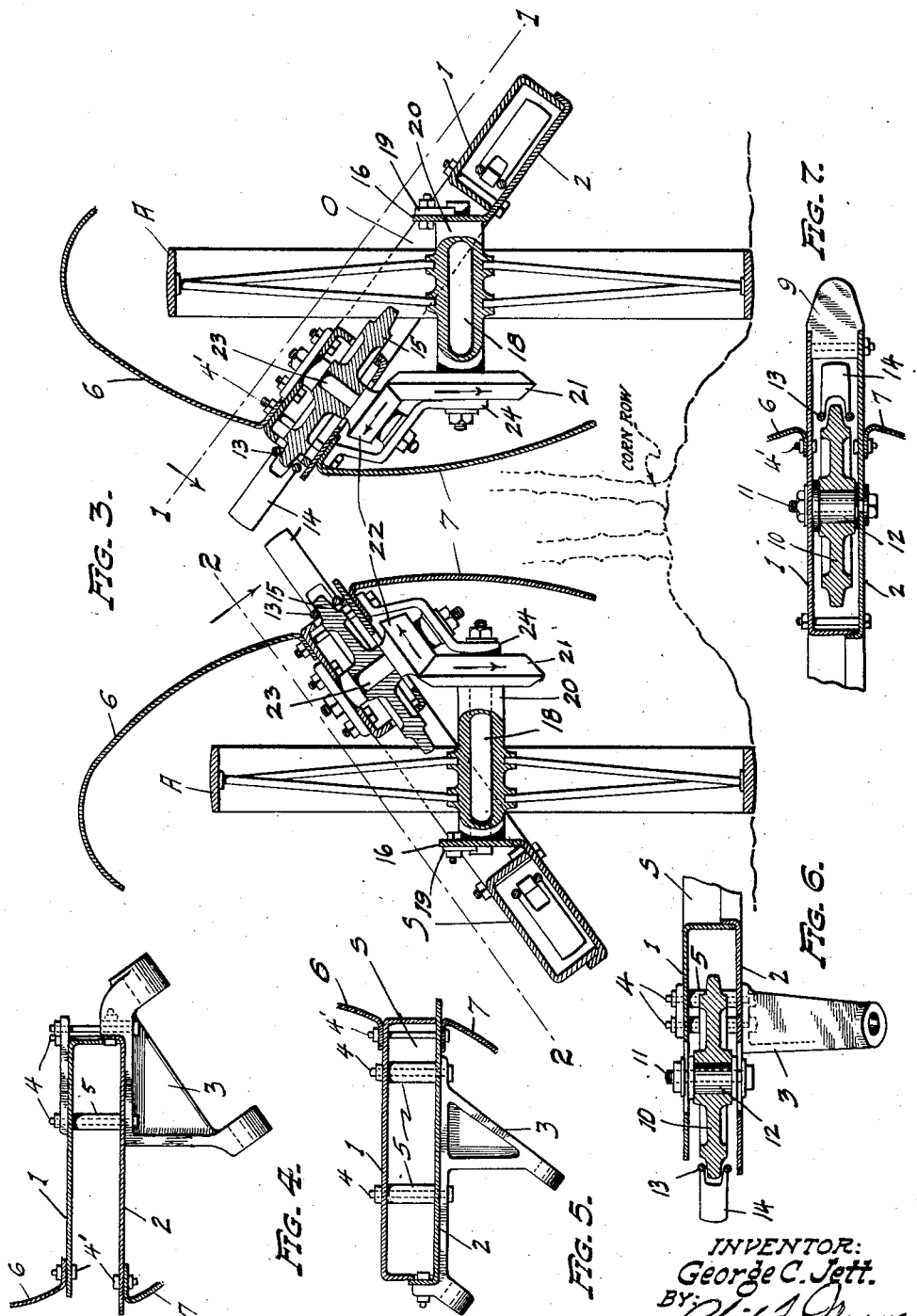

Patented Apr. 3, 1928.

1,665,034

UNITED STATES PATENT OFFICE.

GEORGE C. JETT, OF MILWAUKEE, WISCONSIN, ASSIGNOR TO RUNGE CORN HARVESTER COMPANY, OF MILWAUKEE, WISCONSIN, A CORPORATION OF WISCONSIN.

GATHERER.

Application filed December 10, 1923. Serial No. 679,817.

This invention relates to gatherers for corn harvesting machines.

It has been the universal custom heretofore to build the gathering mechanism into the main frame of the machine so as to be carried by the machine and thus in effect form an integral part thereof. When so arranged it is necessary that the gathering mechanism be positioned well above the ground surface in order to clear high spots in the ground surface and to avoid striking or poking the ground during the rocking or pitching of the machine in its travel over uneven ground.

One object of the present invention is the provision of a self-supported gathering mechanism which may be rockably attached to the machine so as to be little affected by the rocking or pitching of the machine and so as to permit the gathering mechanism to accommodate itself to irregularities in the ground surface. By arranging the gathering mechanism in this manner it may with utmost safety be permitted to more closely follow the ground surface and thus more effectively pick up fallen or broken stalks and deliver them to the machine.

Another object is to utilize the supporting wheels of the gathering mechanism for driving the operating parts thereof to thereby avoid the necessity of transmitting the power necessary for this function through the connections between the gathering mechanism and the main frame of the machine.

Other objects and advantages will appear from the following description of an illustrative embodiment of the present invention.

In the drawings:—

Figure 1 is a face view of one of the units of a gathering mechanism constructed in accordance with the present invention. This view is taken substantially along the line 1—1 of Figure 3.

Fig. 2 is a similar view of a cooperating unit taken substantially along the line 2—2 of Figure 3.

Fig. 3 is a transverse sectional view through the two cooperating units of the gathering mechanism, illustrating the working relation therebetween.

Fig. 4 is a transverse sectional view taken substantially along the line 4—4 of Figure 1.

Fig. 5 is a transverse sectional view taken substantially along the line 5—5 of Figure 2.

Figs. 6 and 7 are longitudinal sectional views taken substantially along the lines 6—6 and 7—7 of Figure 1.

The gathering mechanism selected for illustration comprises two self-contained, self-supported units S and S' provided adjacent their rear ends with separate means for rockable connection with a corn harvesting machine. In use these units are ordinarily mounted side by side to form a restricted passage through which the corn stalks of a row pass and by which these stalks are directed to the machine. The gathering mechanism shown is designed for application to the corn harvesting machine described in my co-pending application Serial No. 642,481, filed May 31, 1923, and for that reason unit S is somewhat longer than unit S'. Otherwise each unit is substantially a counterpart of the other so that a detailed description of one will suffice for both.

Each unit comprises a pressed steel shell 1 preferably of relatively flat elongated form, closed by an appropriate base plate 2, and having a substantially central elongated opening O therethrough. The shell 1 and plate 2 of each unit are rigidly united in spaced relation by any appropriate means such as bolts 4 and 4' and spacer sleeves 5. Each unit is supported upon a wheel A angularly disposed with respect to the plane of the shell and arranged within the opening O. The hub of each wheel A is in the form of an extended sleeve 20 rotatable upon a shaft 18, fixed at its opposite ends in appropriate brackets 16 and 24. Bracket 16 is in the form of an upright plate constituting an integral part of the base plate 2 and bracket 24 is removably attached to and depends from the base plate 2. Shaft 18 is fixed in the bracket 16 by any appropriate means, such as key 19 engaged within a notch therein in a well known manner, the other end of the shaft being threaded to receive a retaining nut 19'.

Each gatherer unit is provided adjacent its rear end with an appropriate bracket 3, removably fixed to the base plate 2, and having a pair of aligned perforated ears 3' for receiving an appropriate pivot pin or shaft (not shown) fixed in horizontal position on the main frame of the machine. It will be noted that the axis of the ears of each pair is inclined relative to the plane of the shell 1, so that when applied to the main frame of the machine the shell of each unit is inclined downwardly from the other as indicated in Figure 3. The units are ordinarily arranged side by side to form a corn stalk passage therebetween and their forward ends are preferably tapered as shown in Figures 1 and 2 to provide an outwardly flaring throat forming an entrance to this passage. As indicated in the copending application hereinabove mentioned the shells of the units also slope downwardly and forwardly from their rockable connections with the machine so that their forward ends closely follow the ground surface. A removable nose piece 9 fixed to the forward end of each shell is adapted to project beneath fallen corn stalks and thereby lift them into the passage during progress of the machine along a row of corn. Appropriate shields 6 and 7, preferably of sheet metal, fixed to the shell of each unit adjacent the inner edge thereof, effectively exclude the corn stalks from the operating parts of the gatherer mechanism, and also serve to direct the stalks in upright position to the harvesting machine.

Provision is made for insuring a uniform advance of the stalks through the gathering mechanism to the machine. This is accomplished in the gatherer shown by the use of an endless chain 13 disposed within the shell of each unit within the plane thereof, and carrying a series of feed fingers 14 projecting laterally therefrom. This chain is trained about two appropriate sprockets 10 housed within the shell 1 at opposite ends thereof. Each sprocket is rotatably mounted upon a spacer sleeve 12 confined between the shell 1 and plate 2 and anchored by any appropriate means such as a stud 11. One stretch of each chain closely follows the inner longitudinal edge of its cooperating shell 1 so that the feed fingers 14 thereof project toward and alternate with the fingers 14 carried by the other chain. Each chain is driven in the direction, indicated by the arrows in Figures 1 and 2, by a sprocket wheel 15 fixed to a stud 23, journaled at its upper end within the shell intermediate the ends of the shell. The lower end of the stud 23 is journaled in the bracket 24 and is driven from the wheel A through a bevel pinion 22 in mesh with a bevel gear 21 fixed to the sleeve or hub 20 of the wheel A.

Various changes may be made in the embodiment of the invention hereinabove specifically described without departing from or sacrificing any of the advantages of the invention as defined in the appended claims.

I claim:—

1. A gathering mechanism for corn harvesting machines comprising two elongated units cooperating to provide a corn passage therebetween, a supporting wheel for each unit, means for rockably connecting each unit to a harvesting machine, cooperating stalk feeding means on said units, and driving connections between said wheels and said feeding means.

2. A gathering mechanism for corn harvesting machines comprising two elongated units cooperating to provide a corn stalk passage therebetween, an individual support for each unit, means for rockably connecting each unit to a harvesting machine, and cooperating stalk feeding means on said units.

3. A gathering mechanism for corn harvesting machines comprising two elongated units cooperating to provide a corn stalk passage therebetween, a supporting wheel for each unit, means for rockably connecting each unit to a harvesting machine, an endless chain carried by each unit having stalk feeding fingers projecting into said passage, and gearing between said wheels and chains for driving said chains.

4. A gathering mechanism for corn harvesting machines comprising two elongated units, an individual support for each unit, means for rockably connecting said units to a harvesting machine in spaced parallel relation to form a corn stalk passage therebetween, and an upright shield connected with each unit adjacent said passage to support the stalks in upright position therein.

5. In a gathering mechanism for corn harvesting machines the combination of a relatively flat elongated frame, a supporting wheel therefor disposed within said frame, said frame lying in a plane angularly disposed with respect to the plane of said wheel, an endless chain mounted in said frame within the plane thereof, stalk feeding fingers carried by said chain, and means driven by said wheel for driving said chain.

6. In a gathering mechanism for corn harvesting machines the combination of two elongated frames, upright shields extending lengthwise of said frames and spaced apart to form a corn stalk passage therebetween, an endless chain carried by each frame, each disposed in a plane inclined downwardly from said passage, means for driving said chain, and stalk feeding fingers carried by said chains within the planes thereof for travel lengthwise of said passage.

In testimony whereof I here affix my signature.

GEORGE C. JETT.